United States Patent
Liu et al.

(10) Patent No.: US 11,628,652 B2
(45) Date of Patent: Apr. 18, 2023

(54) COMPOSITE POLYMER FILMS

(71) Applicant: DuPont Teijin Films U.S. Limited Partnership, Wilmington, DE (US)

(72) Inventors: Shengsheng Liu, Glen Allen, VA (US); Fenghua Deng, Richmond, VA (US); Julian Neal Robinson, North Yorkshire (GB); Moira Tayler, Redcar (GB)

(73) Assignee: DuPont Teijin Films U.S. Limited Partnership, Wilmington, DE (US)

( * ) Notice: Subject to any disclaimer, the term of this patent is extended or adjusted under 35 U.S.C. 154(b) by 0 days.

(21) Appl. No.: 16/650,922

(22) PCT Filed: Sep. 26, 2018

(86) PCT No.: PCT/US2018/052907
§ 371 (c)(1),
(2) Date: Mar. 26, 2020

(87) PCT Pub. No.: WO2019/067582
PCT Pub. Date: Apr. 4, 2019

(65) Prior Publication Data
US 2020/0269552 A1   Aug. 27, 2020

Related U.S. Application Data

(60) Provisional application No. 62/563,695, filed on Sep. 27, 2017.

(51) Int. Cl.
*B32B 27/08* (2006.01)
*B32B 27/32* (2006.01)
(Continued)

(52) U.S. Cl.
CPC ............. *B32B 27/08* (2013.01); *B32B 27/32* (2013.01); *B32B 27/36* (2013.01); *B65B 3/04* (2013.01);
(Continued)

(58) Field of Classification Search
CPC ......... B32B 27/08; B32B 27/32; B32B 27/36; B32B 2255/10; B32B 2255/26;
(Continued)

(56) References Cited

U.S. PATENT DOCUMENTS

| 4,140,733 A | 2/1979 | Meyer et al. |
| 4,452,942 A | 6/1984 | Shida et al. |

(Continued)

FOREIGN PATENT DOCUMENTS

| CM | 102275361 A | 12/2011 |
| CM | 103897612 A | 7/2014 |

(Continued)

OTHER PUBLICATIONS

Engage 8450 Data Sheet; retrieved Jan. 25, 2022; https://www.dow.com/en-us/pdp.engage-8450-polyolefin-elastomer.102470z.html (Year: 2022).*

(Continued)

*Primary Examiner* — James C Yager
(74) *Attorney, Agent, or Firm* — Wolf, Greenfield & Sacks, P.C.

(57) ABSTRACT

A composite film includes a) a self-supporting layer of a polymer film (such as a polyester), b) an optional primer layer on the polymer film layer, wherein the primer layer includes a PVdX (X being halo), acrylic or vinyl resin; and c) a layer of heat seal composition on the primer layer, wherein the heat seal composition includes a polyolefin plastomer (POP) resin and a tackifier that constitutes at least 20 wt % of the heat seal composition. The composite film may be formed by applying a coating composition including the heat seal composition in a solvent to a primer layer on the polymer film or directly on the polymer film in absence of the optional primer layer, and then evaporating the
(Continued)

solvent. The composite film may be heat-sealed to a surface of a container or a self-supporting film.

37 Claims, 2 Drawing Sheets

(51) Int. Cl.
| | | |
|---|---|---|
| *B32B 27/36* | (2006.01) | |
| *B65B 3/04* | (2006.01) | |
| *B65B 7/28* | (2006.01) | |
| *B65D 65/40* | (2006.01) | |
| *B65D 81/34* | (2006.01) | |

(52) U.S. Cl.
CPC ............... *B65B 7/28* (2013.01); *B65D 65/40* (2013.01); *B65D 81/343* (2013.01); *B32B 2255/10* (2013.01); *B32B 2255/26* (2013.01); *B32B 2307/31* (2013.01); *B32B 2307/518* (2013.01); *B32B 2439/70* (2013.01)

(58) Field of Classification Search
CPC .......... B32B 2307/31; B32B 2307/518; B32B 2439/70; B65B 3/04; B65B 7/28; B65D 65/40; B65D 81/343
See application file for complete search history.

(56) References Cited

U.S. PATENT DOCUMENTS

| 4,526,919 | A | 7/1985 | Edwards |
|---|---|---|---|
| 4,542,199 | A | 9/1985 | Kaminsky et al. |
| 4,752,597 | A | 6/1988 | Turner |
| 4,808,561 | A | 2/1989 | Welborn |
| 5,189,192 | A | 2/1993 | LaPointe et al. |
| 5,349,100 | A | 9/1994 | Mintz |
| 5,387,630 | A | 2/1995 | Edwards et al. |
| 6,159,404 | A | 12/2000 | Edwards et al. |
| 6,299,985 | B1 | 10/2001 | Zhang et al. |
| 8,163,833 | B2 | 4/2012 | Moeller et al. |
| 2005/0159549 | A1* | 7/2005 | Kendig ................ B32B 27/08 525/119 |
| 2006/0014022 | A1 | 1/2006 | Kendig et al. |
| 2006/0105126 | A1 | 5/2006 | Kendig |
| 2009/0061137 | A1 | 3/2009 | Konrad et al. |
| 2017/0218152 | A1 | 8/2017 | Liu et al. |

FOREIGN PATENT DOCUMENTS

| CN | 1930231 | A | 3/2007 |
|---|---|---|---|
| CN | 100419006 | C | 9/2008 |
| CN | 101759909 | B | 9/2011 |
| CN | 105111950 | A | 12/2015 |
| CN | 105415829 | A | 3/2016 |
| EP | 0803559 | A1 | 10/1997 |
| JP | 08325539 | A | 12/1996 |
| JP | 3775756 | B2 | 5/2006 |
| JP | 2014-144570 | A | 8/2014 |
| WO | 9317060 | A1 | 9/1993 |
| WO | 2014158396 | A1 | 10/2014 |

OTHER PUBLICATIONS

CN 201880076334.3, dated Aug. 26, 2021, Office Action.
International Preliminary Report on Patentability for International Application No. PCT/US2018/052907, dated Mar. 31, 2020, 7 pages.
International Search Report and Written Opinion for International Application PCT/US2018/052907, dated Dec. 7, 2018, 8 pages.
Jenkins et al., "Glossary of Basic Terms in Polymer Science", Pure & Appl. Chem., vol. 68, No. 12. 1996, pp. 2287-2311.
Plastomer/Elastomer QueoTM 8201, Borealis AG, Product Data Sheet, Ed. 4, dated Feb. 18, 2016, 3 pages.
VistamaxxTM 6102, Performance Polymer, ExxonMobil, Product Data Sheet, dated Aug. 6, 2013, 2 pages.
Okabe, M., "Determination of Number-Average and Weight-Average Molecular Weights of Polymer Sample from Diffusion and Sedimentation Velocity Measurements in Theta Solvent", Journal of Applied Polymer Science, vol. 28, pp. 2325-2339, 1983.
Office Action for CN Application No. CN 201880076334.3 dated Aug. 26, 2021.

* cited by examiner

COMPOSITE POLYMER FILMS

This is the U.S. National Phase Application of International Patent Application No. PCT/US2018/052907, filed Sep. 26, 2018, and claims the benefit of priority of U.S. Provisional Application No. 62/563,695, entitled COMPOSITE POLYESTER FILMS FOR HEAT SEALING TO NON-POLAR SUBSTRATES, filed on Sep. 27, 2017, the disclosures of each of these applications being incorporated herein by reference in their entireties for all purposes.

BACKGROUND OF THE INVENTION

Polymer films capable of being heat sealed to non-polar substrates have become increasingly important since more and more meal manufacturers are switching to polypropylene (PP) trays M order to save cost. Also, the market for induction sealing cap liners for high density polyethylene (HDPE) and PP containers in the pharmaceutic& and food industries has been steadily growing. Ethylene vinyl acetate (EVA) resins have conventionally been used for such applications, but these have tended to produce relatively weak seals to PP and HDPE and this has restricted applicability in many applications. Alternative heat seal adhesives employing traditional low density polyethylene have been introduced, but these tend to have a rather narrow operating temperature window for the heat sealing process, and they cannot be applied by solvent coating to all polymer substrates (e.g. cannot be applied to polyester substrates) due to their extremely poor solubility in common organic solvents. Thus, polymer films (for example polyester films) having heat seal layers addressing these issues would represent a welcome advance in the packaging art.

SUMMARY OF THE INVENTION

Broadly one aspect of the invention provides a composite film comprising:
a) a self-supporting layer of a polymer film, (optionally the polymer film comprising a polar poly riser and/or a polyolefin polymer) and further optionally oriented in at least one direction),
b) an optional primer layer on the polymer film, and in between the polymer film and a heat se& layer (c), wherein the optional primer layer comprises a halo poiyvinyldine polymer, an acrylic resin and/or a vinyl resin; and
wherein the heat seal layer comprising a heat seal composition is either disposed on the optional primer layer where present, or directly on a surface of the polymer film in the absence of the optional primer layer (b),
wherein the heat seal composition comprises a polyolefin plastomer (POP) resin and a tackifier; and where
(i) the tackifier is present in an amount of at least 20% by weight of the heat se& composition, the total weight of the heat seal composition being 100%; and
(ii) the POP resin is present in an amount of no more that 80% by weight of the heat seat composition, the tot& weight of the heat seal composition being 100%; and where
(iii) the optional primer layer is only absent when the polymer film comprises polyolefin and where in the absence of the optional primer layer (b), the surface of the polymer fiim in contact with the heat layer (c) has been corona treated.

The composite film may comprise the heat seal composition which further comprises an acrylic resin and/or a vinyl resin.

The composite film may comprise the halo polyvinyldiene polymer in the optional primer layer (b) that comprises, a PVdX resin where X is halo (e.g. X is chloro), more preferably a PVdC resin, most preferably consists of a PVdC resin.

The composite film may comprise the acrylic resin and/or the vinyl resin present in the optional primer layer (b) and/or the heat seal layer (c), the acrylic resin and/or the vinyl resin being selected from the group consisting of: $C_{1-4}$ alkyl vinyl acetate resin and $C_{1-4}$ (meth) acrylic acid resin, preferably from the group consisting of: ethyia acrylate (EA), ethylene vinyl acetate (EVA), ethyl acrylic acid (EAA) and ethyl methacrylic acid (EMA).

The composite film may comprise the POP resin in the heat seal layer (c), suitable POP resins being further defined herein.

The DSC melting point of the POP resin may be below 100° C.

The molecular weights (such as weight average ($M_w$) and number average ($M_n$) of the polymers and resins described herein may be determined by any suitable method known to those skilled in the art, such as by experiment (e.g. GPC, SEC etc.) and/or theoretical calculations. A method to measure $M_w$ and is described in "Determination of Number-Average and Weight-Average Moiecular Weights of Polymer Sample from Diffusion and Sedimentation Velocity Measurements in Theta Solvent" by Okabe and Matsuda, Vol 28, pages 2325 to 23339, Journal of Applied Polymer Science, which article is encorporated herein by reference.

The amount of α(alpha)-olefin co-monomer in the POP resin may be from 5 to 85 mol % based on the total amount of POP resin being 100 mol %.

The composite film may comprise the POP resin is present in an amount of no more than 75% by weight, the total weight of the heat seal composition being 100%.

The composite film may comprise the tackifier which is a tackifier resin and preferably which constitutes at least 25% by weight of the heat seal composition, the total weight of the heat seal composition being 100%.

The composite film may comprise at least one poiyester selected from the group consisting of polyethylene terephthalate (PET), polylactic acid (PLA), polyhydroxybutyrate (PHB), polyethylene furanoate (PEP) and polyethylene naphthalate (PEN).

Another aspect of the invention provides a method of making the composite film of the invention comprising the steps of:
(i) applying a coating composition comprising the heat seal composition in a solvent to either the primer layer on the polymer film (such as to a polar film for example to a polyester film) or in the absence of the optional primer layer, directly to the surface of the polymer film that has been corona treated, and then;
(ii) evaporating the solvent, wherein the heat seal composition comprises a polyolefin elastomer (POP) resin,
a tackifier resin present in an amount of at least 20% by weight, the heat seal composition being 100%, and optionally an acrylic resin and/or a vinyl resin, preferably an EVA resin.

A further aspect of the invention provides a method of bonding a polymer film to a container or a self-supporting film, comprising heat sealing a composite film of the invention as described herein to a surface of the container or the self-supporting film. The surface may be the surface of a polyolefin, for example a polypropylene (PP) and/or high density polyethylene (HDPE) surface. The heat sealable composite film of the invention may be an unprimed polyolefin film or a primed polar film (such as a primed polyester film) that comprises thereon the heat seal layer as described herein.

DETAILED DESCRIPTION OF THE INVENTION

Figure 1:
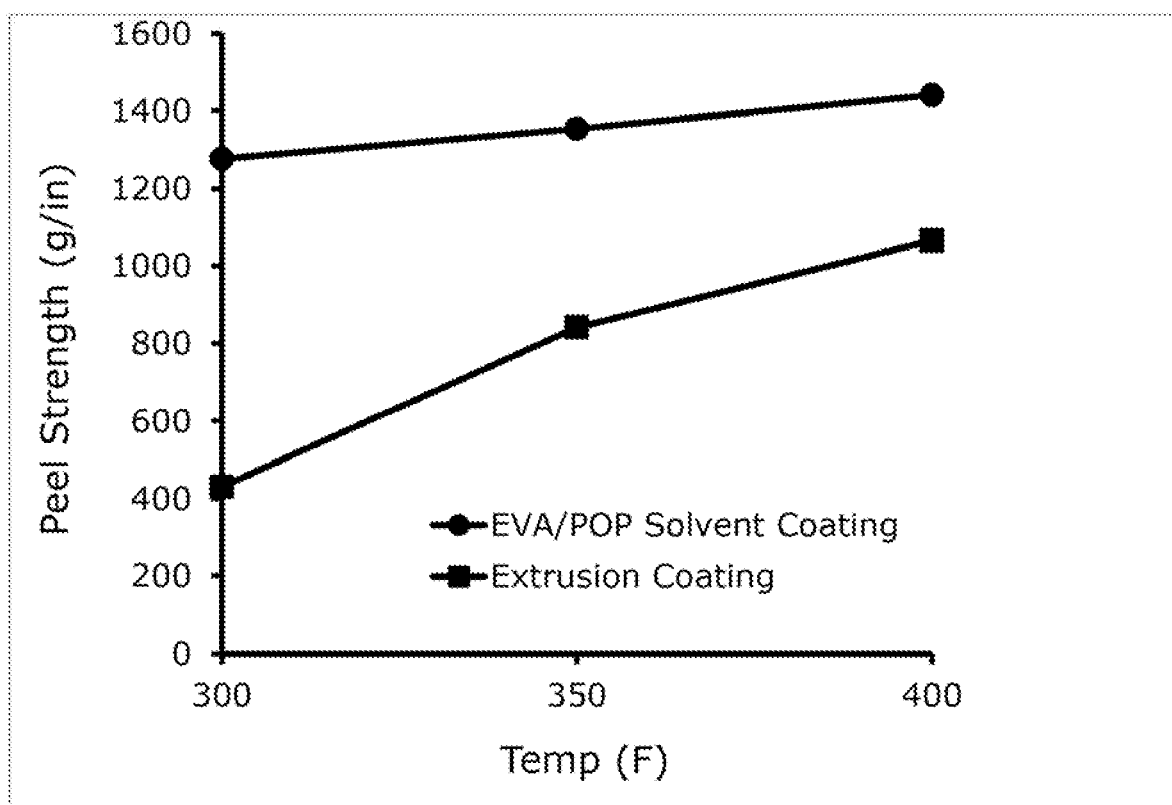
FIG. 1 shows peel strength as a function of the temperature at which heat sealing was performed, for a composite film, comprising a primed polyester film coated with a heat seal composition, heat sealed to an HDPE substrate according to the invention, compared with heat sealing a prior art film bearing an extrusion-coated EVA heat seal layer.

The invention provides composite films providing excellent heat seal strength to a variety of substrates, including non-polar substrates such as polyolefin substrates e.g. PP and HDPE. The composite films have a very broad temperature window for heat sealing to the substrates, and offer the advantage that they can be applied by solvent coating. The composite films have conveniently low heat seal initiation temperatures and provide relatively constant peel strength as a function of heat seal temperature, compared with films using traditional heat seal compositions. This allows shorter dwell time in the heat sealing process, which benefits process efficiency.

As used herein, the term "heat seal initiation temperature" is the temperature at which sealing at 80 psi (~552 kPa) for 1 second produces a peel strength to an HDPE substrate of at least 350 g force/inch (~135 N/m). The heat seal initiation temperature is the minimum temperature at which the sealing polymer is molten enough to flow and to melt-bond to an adjacent layer in the seal. Below this temperature, the coating will have insufficient bonding strength to the substrate. In many packaging line applications, sealing temperatures considerably above the heat seal initiation temperature are commonly used to ensure sufficient seal strength.

Heat seal initiation temperatures for compositions of composite films useful for the invention are typically no higher than 265° F. (~129° C.) or 275° F. (~141° C.). Moreover, the compositions of the composite films according to various embodiments of the invention provide remarkably little change in peel strength over a wide range of seal temperatures, compared with typical extrusion-coated products. The peel strength for heat seals produced 275° F. (~141° C.) is typically at least 70% of that produced at 400° F. (~204° C.), or at least 75%, or ≥80%, or ≥85%, or ≥90%.

Composite films according to the invention typically provide a peel strength, when applied to an HDPE substrate at 300° F. (~149° C.), and 80 psi (~552 kPa) for 1 second, of at least 350 g force/inch (~135 N/m), or at least 500, or ≥700, or ≥900, or ≥925, or ≥950, or ≥975, or ≥1000, or ≥1025 g force/inch (respectively ≥~193 N/m, ≥~270 N/m, ≥~347 N/m, ≥~357 N/m, ≥~367 N/m, ≥~376 N/m, ≥~386 N/m & ≥~396 N/m).

The inventors have found that, due to the high tackifier content of the heat seal compositions of the invention, these heat seal compositions cannot typically be applied by extrusion coating, due to poor chill roll release. The inventors have solved this problem by solvent coating the heat seal compositions onto a primed substrate, where the primed substrate comprises a primer layer on a polar polymer film (such as a polyester). The heat seal compositions can also be coated onto an unprimed substrate, where the unprimed substrate comprises a polyolefin polymer film, which may be corona treated optionally, as an alternative to use of a primer coating, though use of a primer is still preferred to provide improved adhesion of the heat sealing layer to the polymer film as it may prevent delamination of the composite film under a wider range of conditions. The present invention also addresses issues with heat stability that prevent certain types of tackifier resins from being used in extrusion coating. For example, tackifiers having a low softening point (e.g., Piccolyte® C85 resin, softening point 82-88° C.) may cause smoking under typical extrusion coating conditions.

Composite films of the invention may be heat sealed to a container or a self-supporting film, using the heat seal layer as the contacting layer with the container or with the self-supporting film. The container may be pre-formed, and the surface of the container that is to be joined to the composite film may be made of any material. Suitable exemplary materials include glass metals, and polymers. Exemplary polymers include nylons and polyesters, including polyesters that are not themselves heat sealable, for example polyethylene terephthalate (PET) homopolymer. Most particularly, the material may be HDPE or PP. If the composite film is instead heat sealed to a self-supporting film, the surface of the self-supporting film to which the composite film is heat sealed may be made from any of these same materials.

The composite films of the invention include a self-supporting layer of a polymer film, an optional primer layer on the polymer film (optional if the polymer film is a corona treated polyolefin film), and a heat seal layer on the primer layer or directly on an unprimed corona treated polymer film in the absence of the optional primer layer. Typically, all of these layers are coextensive.

The heat seal layer includes a heat seal composition comprising one or more acrylic resin(s) and/or vinyl resin(s), preferably EVA, EAA or EMA, more preferably EVA resin (s), one or more tackifier(s) (e.g. tackifier resin(s)), and one or more polyolefin plastomer (POP) resin(s). Each of the components of the composite film will be discussed in detail herein, including a description of the components in the heat seal layer.

A yet further aspect of the invention provides use of a film of the invention as described herein as a heat sealable component of a packaging article (for example an ovenable food container) and/or as a liner for a cap for a packaging article.

A still further aspect of the invention provides a packaging article comprising a composite film of the invention as described herein, for example the packaging article comprising an ovenable food container optionally comprising a HDPE or PP tray and/or a cap for a packaging article lined with a composite film of the invention as described herein.

Acrylic Resin and/or Vinyl Resins

Acrylic resins and/or vinyl resins refer to sub sets of resins which may be obtained and/or obtainable from at least one polymer precursor (i.e. which itself may be polymeric e.g. an oligomer or a monomer) which comprise an activated unsaturated moiety.

The term "activated unsaturated moiety", is used herein to denote a species comprising at least one unsaturated carbon to carbon double bond in chemical proximity to at least one activating moiety. Preferably the activating moiety comprises any group which activates an ethylenically unsaturated double bond for addition thereon by a suitable electrophillic group. Conveniently the activating moiety comprises oxy, thio, (optionally organo substituted)amino, thiocarbonyl and/or carbonyl groups (the latter two groups optionally substituted by thio, oxy or (optionally organo substituted) amino). More convenient activating moieties are (thio)ether, (thio)ester and/or (thio)amide moiet(ies). Most convenient "activated unsaturated moieties" comprise an "unsaturated ester moiety" which denotes an organo species comprising one or more "hydrocarbylidenyl(thio) carbonyl(thio)oxy" and/or one or more "hydrocarbylidenyl (thio)-carbonyl(organo)amino" groups and/or analogous and/or derived moieties for example moieties comprising (meth)acrylate functionalities and/or derivatives thereof. "Unsaturated ester moieties" may optionally comprise optionally substituted generic α,β-unsaturated adds, esters and/or other derivatives thereof including thio derivatives and analogs thereof.

Acrylic and/or vinylic polymer precursors (such as acrylic and/or vinylic oligomers or monomers) that are suitable for preparing acrylic and/or vinyl resins that may be used in the present invention, may comprise one or more hydrophobic, hydrophilic and/or partially hydrophilic polymer precursors as components thereof that may be polymerized to form the acrylic and/or vinyl polymer.

The hydrophobic polymer precursor may comprise, conveniently consist essentially of, at least one hydrophobic polymer precursor comprising at least one activated unsaturated moiety, conveniently at least one hydrophobic (meth) acrylate monomer, and/or arylalkylene polymer precursor. As used herein (meth)acrylate denotes an acrylate and/or methacrylate moiety and similarly herein (meth)acrylic denotes an acrylic and/or methacrylic moiety.

The hydrophobic (meth)acrylate may comprise $C_{>4}$ hydrocarbo (meth)acrylate(s) and conveniently the $C_{>4}$ hydrocarbo moiety may be $C_{4-20}$ hydrocarbyl, more conveniently $C_{4-14}$ alkyl most conveniently $C_{4-10}$ alkyl, for example $C_{4-8}$ alkyl. Hydrophobic (meth)acrylate(s) may be selected from: isooctyl acrylate, 4-methyl-2-pentyl acrylate, 2-methylbutyl acrylate, isoamyl acrylate, sec-butyl acryiate, n-butyl acryiate, 2-ethylhexyl acrylate, isodecyl methacrylate, isononyl acrylate, isodecyl acrylate, and/or mixtures thereof.

Arylalkylene monomers may comprises (optionally hydrocarbo substituted) stryene and the optional hydrocarbo may be $C_{1-10}$ hydrocarbyl, more conveniently $C_{1-4}$ alkyl. Arylalkylene monomers are selected from: styrene, α-methyl styrene, vinyl toluene, t-butyl styrene, di-methyl styrene and/or mixtures thereof.

Hydrophilic polymer precursors may be those that are co-polymerisible with the hydrophobic polymer precursor(s) and are water soluble. At least one hydrophobic polymer precursor may comprise at least one activated unsaturated moiety. Hydrophilic monomers comprise, advantageously consist essentially of, at least one ethylenically unsaturated carboxylic acid (such as acids having one ethylenic group and one or two carboxy groups). Acid(s) may be selected from the group consisting of: acrylic acid (and oligomers thereof), beta carboxy ethyl acrylate, citraconic acid, crotonic acid, fumaric acid, itaconic acid, maleic acid, methacrylic acid and mixtures thereof.

Partially hydrophilic polymer precursor(s) may also be referred to as partially water soluble monomers and conveniently may comprise at least one activated unsaturated moiety. Preferred partially hydrophilic monomers comprise, conveniently consist essentially of, at ieast one $C_{1-2}$alkyl (meth)acrylate. More preferred partially hydrophilic monomers are selected from the group consisting of: methyl acrylate (MA), methyl methacrylate (MMA), ethyl acrylate (EA) and mixtures thereof.

An example of a suitable ethyl acrylate (EA) resin are those resins available commercially from DuPont under the trade designation Bynel® 2000 series.

Ethylene-vinyl acetate (EVA) resin, also known as poly (ethylene-vinyl acetate) (PEVA), denotes the class of copolymers formed from ethylene and vinyl acetate monomers. Vinyl acetate (VA) has the structure

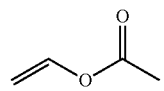

Ethylene-acrylic acid (EAA) resin denotes the class of copolymers formed from ethylene and acrylic acid (AA) monomers. Acrylic Acid (AA) has the structure

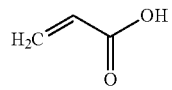

Ethylene-methacrylic acid (EMA) resin denotes the class of copolymers formed from ethylene and methacrylic acid (MAA) monomers. Metharrylic Acid (MAA) has the structure

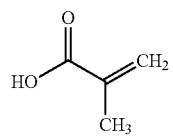

Typically, the total amount of the one or more acrylic resins and/or vinyl resins (such as EA, EAA, EVA and/or EMA resin(s)) in the heat seal composition of the heat seal layer is at least 15%, or at least 18%, or at least 20%, or at least 25%, or 30% acrylic and/or vinyl resin(s) by weight of the heat seal composition. Typically, at most 60%, or at most 55%, 50%, 45%, or 40% of acrylic and/or vinyl resin(s) will be present in the heat seal composition, all weights of acrylic and/or vinyl resin based on the total weight of the respective heat seal composition being 100% (depending of which composition the acrylic and/or vinyl resin(s) forms a part). EVA resins are the preferred vinyl resin, more preferably used in the previous stated amounts. The total amount of the acrylic and/or vinyl resin(s) present in the heat seal composition may be from 15% to 60%, preferably from 18% to 55%, more preferably from 20% to 50%, even more preferably from 25% to 45%, most preferably from 30% to 40% or for example 18%, 23%, 30%, 34%, 36%, 54% or 60% by weight of the heat, seal composition. All weights of the acrylic and/or vinyl resin(s) described herein are based on the total weight of the respective heat seal composition being 100%.

It will be understood that if any acrylic and/or vinyl resin is also present as a component of the optional primer layer, the amounts of any such acrylic and/or vinyl resin primer layer components will be calculated separately and do not form part of the amounts described herein for acrylic and/or vinyl resins that may form part of the heat seal layer.

Ethylene vinyl acetate (EVA) polymers useful for the invention contain vinyl acetate at from 15 to 50 wt %, or 18 to 40 wt %, or 25 to 40 wt %. Such EVA resins are commercially available from DuPont under the trademark Elvax® (250, 420, 3180, 3185, 4031, 4260), Celanese under the trademark Ateva® (2810A, 2821A, 3325AC, 4031AC), Arkema under the trademark Evatane® (28-05, 28-25, 28-40, 28-150, 33-25, 33-45, 40-55, 42-60).

The EVA resin may also be an EVA terpolymers. These are rpolymers of ethylene, vinyl acetate, and acrylic or methacrylic acid Examples include Elvax® 4260, 4310, and 4320.

Tackiflers

In order to provide a suitably low heat seal initiation temperature, as well as a relatively constant heat seal peel strength as a function of heat seal temperature, the heat seal compositions include a total amount of the one or more tackifier(s), in an amount of at least 20% by weight of the heat seal composition or at least 22%, 25%, 27%, or 30% of the tackifier(s) by total weight of the heat seal composition. The tackifier may be a tackifier resin. However, since tackifier(s) tend to be relatively expensive compared with the other components in the heat seal composition and tend to generate coating blocking issues, there may be disadvantages to including more than 60% by weight of total tackifier in the heat seal composition for typical applications. Typically the total amount of the tackifier(s) that will be present in the heat seal composition will be, at most 60%, or at most 55%, 50%, or 45% of tackifier(s) by weight of the heat seal composition. The total amount of the tackifier(s) present in the heat seal composition may be from 20% to 60%, preferably from 22% to 60%, more preferably from 25% to 55%, even more preferably from 27% to 50%, most preferably from 30% to 45%, or for example 6%, 18%, 24%, 25%, 30% or 60% by weight of the heat seal composition. All weights of the tackifier(s) described herein are based on the total weight of the heat seal composition being 100%.

Tackifier(s) (which may comprise tackifier resin(s)) suitable for the invention include, but are not limited to, synthetic and natural polyterpenes, hydrocarbon resins, rosin and rosin ester resins, and combinations thereof. The tackifier resins may have ring and ball softening points from 20° C. to 160° C., preferably 90° C. to 125° C. The number average molecular weights of the tackifier resins are typically at least 200 or 500, and typically at most 5000, 2000, or 1000 daltons and thus typically may have a $M_n$ from 200 to 5000, preferably 500 to 1000 daltons, more preferably 500 to 1000 daltons.

Natural polyterpene tackifier resins are based on natural and renewable feed ocks, including alpha-pinene, beta-pinene and d-limonene. Examples include:
1) Piccolyte® C resin (C85, C105, C115, C125, C135), Piccolyte® F resin (F105, F115), Piccolyte® A resin (A25, A115, A125, A135), Piccolyte® S resin (525, 585, 5115, 5125, 5135); all available from Pinova,
2) Sylvares® TR resin (A25L, 90, 105, 7115, 7125); all available from Arizona Chemical.

Hydrocarbon tackifier resins are made from petroleum based feedstocks, either aliphatic (C5), aromatic (C9), DCPD (dicyclopentadiene), or mixtures of these Examples Include:
1) Piccotac™ 1020, 1095, 1100, 1115, 6095-E, 8095; Pisco™ 5120, 5140, 6100, 2215; Regalite™ 51100, 7125; Regalite™ R1010, 1100, 9100, Regairez™ 1018, 1094, 3102, 6108; all available from Eastman;
2) Qulntoneq® A100, B170, K100, M100 N295, U190, 5100, D100, U185; all available from Nippon Zeon of Japan;
3) Escorez™ 1102, 1304, 1315, 2203, 5300, 5320, 5340, 5400, 5415, 5600, 5615, 5690; all available from ExxonMobil;
4) Wingtack® 86, 95, 98; Norsolene® W85, 90, 100, 110, 120, 130, 140; all available from Cray Valley.

Rosin ester tackifier resins are produced by the reaction between rosin acids and alcohols. The rosin acids may be modified by hydrogenation or disproportionation. The typical commercial products are methyl, triethylene glycol glycerol, and pentaerythrital esters. Examples include:
1) Foral® 85, 105; 3085; Pentalyng H, Pentalyn® 9085, 9100; Staybelite® Ester 3, 5, 10; all available from Pinova;
2) Sylvalite™ RE8OHP, RE85GE, RE100XL, RE100L, 105L, 110L, RE25, 85, 98; all available from Arizona Chemical;
3) Foralyn™ 90, 110, 50201; Permalyn™ 2085, 5095, 3100, 5110, 6110; all available from Eastman.

Polyolefin Plastomer (POP) Resin

Typically, the heat seal compositions include at least 10% in total of one or more polyolefin plastomer (POP) resin(s) by weight, or at least 15% or 20% by weight of the POP resin(s) by weight of heat seal composition. Typically, at most 60%, or at most 50%, 40%, or 30t % by weight of POP resin(s) will be present by weight of the heal seal composition. The total amount of the POP resins) present in the heat seal composition may be from 10% to 60%, preferably from 10% to 50%, more preferably from 15% to 40%, most preferably from 20% to 30% by weight of the heat seal composition. All weights of the POP resin(s) described herein are based on the total weight of the heat seal composition being 100%.

Polyolefin plastomer (POP) resins are polymers that combine the qualities of elastomers and plastics, providing rubber-like properties with the processing ability of a thermoplastic. POP resins suitable for use in the invention comprise ethylene and at least one $C_3$-$C_{20}$ α(alpha)-olefin, preferably a $C_4$-$C_4$ α(alpha)-olefin, polymerized using a metallocene catalyst. Examples of such resins, and methods of making them, are disclosed in U.S. Pat. Nos. 4,542,199, 4,752,597, 4,808,561, 5,189,192 and 5,349,100 all of which are incorporated herein by reference for all purposes. Suitable plastomers are commercially available under the trademarks Affinity™, Versify™ and Engage™ (Dow Chemicals), Queo™ (Borealis), Exact™ and VistaMaxx™ (ExxonMabil).

POP resins used in the present invention are obtained or obtainable from at least one monomer of Formula 1

$CH_2=CHR$           Formula 1 where R is H or $C_{1-10}$ alkyl (and preferably Formula 1 representing an ethylene monomer) together with at least one other, different, polymer precursor selected from any of I to V:

I. at least one different polymer precursor also represented by Formula 1
II. at least one polymer precursor represented by Formula 2

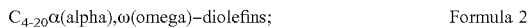

$C_{4-20}$ α(alpha),ω(omega)–diolefins;           Formula 2

III. at least one polymer precursor represented by Formula 3

$C_{3-20}$ α(alpha)–olefins;           Formula 3

IV. at least one polymer precursor represented by Formula 4

$$C_{\geq 18} \text{ diolefins};$$ Formula 4 and

V. at least one polymer precursor represented by Formula 5

$$C_{4-18} \text{ cyclic olefins(including norborene)}$$ Formula 5,

Usefully POP resins for use in the present invention may be copolymer(s) of at least one $C_{2-4}$ alkylene and at least one polymer percusor of any of Formulae 2 to 5.

Preferred POP resins are copolymer(s) of ethylene and/or propylene at least $C_{5-20}$ hydrocarbylene, more preferably are capolymer(s) of ethylene and at least one $C_{6-15}$ alkylene, even more preferably are copolymer(s) of ethylene and at least one $C_{6-12}$ alkylene, most preferably are copolymer(s) of ethylene and at least one linear monounsaturated $C_{6-10}$ alkylene, for example is a copolymer of ethylene and 1-octene.

Conveniently POP resins for use in the present invention are prepared using a suitable catalyst, more conveniently being other than a Ziegler-Matta catalyst or a free radical initiators, most conveniently the catalyst being selected from the group consisting of: metallocenes (such as complexes with zrconium, hafnium and/or vanadium), alumoxane, anionic, nonionic ligand systems with group 4 to 8 metals and/or chiral organo metallic complexes.

The polyolefin plastomer resins used in the present the invention may combine qualities of elastomers and plastics, for example by exhibiting rubber-like properties with the processing ability of plastic. Current commercially available POP resins are copolymers of ethylene andl other olefins typically made with metallocene catalysts. In contrast typical low density olefin polymers (such as linear low density polyethylene (LLDPE); low density polyethylene (LDPE) and very linear low density polyethylene (VLDPE)) are manufactured by conventional Ziegler-Natta catalysts or free radical initiators. Without wishing to be bound by any theory the applicant believes that as POP resins may comprise high amounts of other olefin units, have a very low melting point and reduced crystallinity yet still exhibit a relatively high molecular weight, POP resins may be particularly suited to the requirements of a heat sealable coating.

The molecular weight of a polymer or oligomer as described herein, for example weight average molecular weight (also denoted as $M_w$) or number average molecular weight (also denoted as $M_n$) may be calculated by theory and/or measured by any suitable conventional methods, for example by Gel Permeation Chromatography (GPC); Gas Chromatography Mass Spectrometry (GC-MS) and/or by Size Exclusion Chromatography (SEC) as known to those skilled in the art. GPC method is preferred using a polystyrene standard.

The weight average molecular weights ($M_w$) of the POP plastomers for use in the invention are typically at least 3, or at least 5, or at least 12, or at least 15 and at most 60, or at most 50 or at most 40 or at most 30 kilodaltons, $M_w$ preferably determined by GPC using a polystyrene standard. Usefully the POP plastomers have a $M_w$ of from 3 to 60 kilodaltons, or from 5 to 50 kilodaltons, or from 12 to 40 kilodaltons or from 15 to 30 kilodaltons.

The number average molecular weights ($M_n$) of the POP plastomers for use in the invention are typically at least 5, or at least 15 and at most 50, or at most 30 kilodaltons, $M_n$ preferably determined by GPC using a polystyrene standard.

Usefully the POP plastomers have a $M_n$ of from 5 to 50 kilodalLons or from 15 to 30 kilocialtons.

The amount of α(alpha)-olefin comonomer in the plastomer is from 5 to 85 mol %, preferably from 10 to 25 mol %, more preferably from 10 to 30 mol %. The DSC melting point of the plastomer is typically below 100° C., or at most 70° C. It is typically at least 40° C., or at least 45° C. or 50° C. The tensile strength of the plastomer is generally from 1.0 to 20 MPa, preferably from 5 to 10 MPa [20 in/min (~50.8 cm/min.), ASTM D369].

Typically, POP resins suitable for use according to the invention are soluble to at least a 10% solids level in at least one of toluene, xylene, dichlorobenzene, trichlorobenzene or a mixture of any of these with THF or ethyl acetate, in each case at 65° C. Typically, the resulting solutions are clear.

Other Ingredients

Slip additives are used to reduce the resistance of composite film to sliding over itself or parts of converting equipment. The most common slip additives in coating industry are long-chain, fatty acid amides, such as erucamide and oleamide.

One or more slip agents, for example calcium stearate or fatty acid amides (for example Kemamide® EZ and Kemamide® OR, available from Chemtura) is/are typically included in the heat seal composition. If included, the slip agent(s) in total will typically constitute at least 0.15% by weight of the heat seal composition, or at least 0.2%, 0.5%, 1%, 1.5%, 2%, 2.5%, 3%, or 3.5% by weight of the heat seal composition.

The slip agent(s) in total will typically constitute at most 7 wt % of the composition, or at most 6.5%, 5.5%, 5%, or 4.5% of the heat seal composition. The total amount of the slip agent(s) present in the heat seal composition may be from 0.15% to 7%, preferably from 0.2% to 6.5%, more preferably from 0.5% to 6.5%, even more preferably from 1% to 6.5%, most preferably from 1.5% to 6.5% or from 2% to 6% or from 2.5% to 5.5% or from 3% to 5% or from 3.5% to 4.5%, or for example 1.5%, 1.7% or 2.5% by weight of the heat seal composition. All weights of the slip agent(s) described herein are based on the total weight of the heat seal composition being 100%.

Optional ingredients for the heat seal layer may, among others, include one or more of the following: anti-block additives and/or matting agents, e.g., silica such as Syloid 244 or Syloid 620, available from Grace Davison (optionally present in an amount of from 1% to 3%, preferably 1.5% to 2.5%, for example 1.5%; 2.2% or 2.5% by weight of the heat seal composition) anti-fog agents, e.g., sorbitan esters such as ATMER™ 100, available from Croda Polymer Additives; anti-static agents, e.g., glycerol esters such as Atmer™ 129, available from Croda Polymer Additives; UV absorbers, e.g., Tinuvin® 477 DW and Tinuvin® 1130, available from Ciba; and pigments, e.g., titanium dioxide such as Ti-Pure™ R-101, available from Chemours.

The heat seal composition forms the heat seal layer of the composite films of the invention so the same weight % of acrylic resin(s), vinyl resin(s), POP resin(s) tackifier(s), slip agent(s) and/or any other components thereof given herein in the heat seal composition also correspond to the total weight of those component(s) by weight that may be present in the heat seal layer where the total weight of the heat seal layer is 100%.

Polymer Film

The polymer film used in the present invention, prior to deposition of any coating or layer may be any suitable polymer than that is capable of forming a film and may thus comprise; polyolefins [e.g. polypropylene (PP) and/or polyethylene (PE)] polyurethanes, polyvinylhalides [e.g. polyvinyichloride (PVC)], polar polymers, polyesters [e.g. polyethylene terephthalate (PET)] or other polyesters as described herein, polyamides [e.g. nylons], polyaryletherketones, and/or non-hydrocarbon polymers); suitable combinations and/or mixtures thereof.

Preferably the polymer film comprises a homopolymer, a crystalline polymer and/or a polymer of randomly oriented amorphous non-crystalline polymer chains.

Conveniently the polyolefin films to be used as the polymer film in the present nvention may comprise one or more polyolefins [e.g, polypropylene homopolymer, polyethylene homopolymer [e.g. linear low-density polyethylene (LLDPE)] and/or polypropylene/polyethylene copolymer(s); optionally in one or more layers]. The constituent polymers and/or layers in a polymer film of the present invention may be oriented, blown, shrunk, stretched, cast, extruded, co-extruded and/or comprise any suitable mixtures and/or combinations thereof. The polymer film may optionally be crosslinked by any suitable means such as electron beam (EB) or UV crosslinking, if necessary by use of suitable additives in the polymer film.

The definition of polyolefin, as intended herein, is a polymer assembled from a significant percentage, preferably ≥50% by weight of one or more olefin monomers. A copolymer is a polymer assembled from two or more monomers. Polyolefin films may include, but are not limited to, polyethylene homopolymers, ethylene-α-olefin copolymers, polypropylene-α-olefin copolymers, polypropylene homopolymers, ethylene-vinyl acetate copolymers, ethylene-methacrylic acid copolymers and their salts, ethylene-styrene polymers and/or blends of such polymers.

Polymeric resins used to produce the polymer films of the present invention are generally commercially available in pellet form and may be melt blended or mechanically mixed by well-known methods known in the art, using commercially available equipment including tumblers, mixers and/or blenders. The resins may have other additional resins blended therewith along with well-known additives such as processing aids and/or colorants. Methods for producing polymer films are well-known and include the techniques of casting films as thin sheets through narrow slit dies, and blown-film techniques wherein an extruded tube of molten polymer is inflated to the desired bubble diameter and/or film thickness. For example to produce a polymer film the resins and additives may be introduced into an extruder where the resins are melt piastified by heating and then transferred to an extrusion die for formation into a film tube. Extrusion and die temperatures will oenerally depend upon the particular resin being processed and suitable temperature ranges are generally known in the art or provided in technical bulletins made available by resin manufacturers, Processing temperatures may vary depending upon process parameters chosen.

The polymer film of the present invention may be unoriented (cast film), may preferably orientated in at least one direction (monoaxiaily orientated), more preferably orientated in two directions (biaxially orientated).

Orientation of the polymer film of the present invention may be achieved by stretching the polymer film at a temperature above the glass transition temperature (Tg) of its constituent polymer(s). The resultant oriented polymer film may exhibit greatly improved tensile and stiffness properties. Orientation may be along one axis if the polymer film is stretched in only one direction, or may be biaxial if the polymer film is stretched in each of two mutually perpendicular directions in the plane of the film. A biaxial oriented polymer film may be balanced or unbalanced, where an unbalanced film has a higher degree of orientation in a preferred direction, usually the transverse direction. Conventionally the longitudinal direction (LD) is the direction in which the film passes through the machine (also known as the machine direction or MD) and the transverse direction (TD) is perpendicular to MD. Preferred polymer films are oriented in both MD and TD. Orientation of the polymer film may be achieved by any suitable technique. For example a flat polymer film may be oriented by simultaneous or sequential stretching in each of two mutually perpendicular directions by means of a stenter, or by a combination of draw rolls and a stenter. In a bubble process a polymer film is extruded in the form of a composite tube which is subsequently quenched, reheated, and then expanded by internal gas pressure to oriented in the TD, and withdrawn, at a rate greater than that at which it is extruded, to stretch and orient it in the MD.

The polymer film of the composite film is self-supporting, and it is Preferred to be a biaxially oriented film optionally a polar polymer or a polyolefin. The polymer film may optionally contain slip additives and/or anti-block additives.

As used herein the term "polar polymer" denotes a polymer which is obtained and/or obtainable from at least one polymer precursor which itself comprises polar moieties) and/or where the polymer comprises a repeat unit comprising polar rrioeit(ies). One example of such a polar moeity is a carbonyloxy moiety. The term polar polymer does not therefore necessarily imply any common properties in the resultant polymer or in films made therefrom. Usefully the polar polymers comprise polyester polymers and/or polyaryletherketone polymers.

Examples of polar polymers comprise polyaryletherketones; polyesters that comprise polyethylene terephthalate (PET), polylactate (PLA), polyhydroxybutyrate (PHB), polyfuranoate (PEF) and/or polyethylene napthalate (PEN); copolyesters comprising or consisting of repeat un for any of the foregoing (or any other polyesters described herein) such as: terephthalic acid, lactic acid, hydroxybutyric acid, furanoic acid, napthalic acid and/or aliphatic dicarboxylic acids and dials; for example copolyesters of terephthalic acid, napthalic acid and/or aliphatic dicarboxylic acids and diol. Further examples of suitable polar polymers are described herein. Polyesters are particularly preferred to form the self supporting layer of the polymer film described herein.

The polymer film may have shrinkage of less than 5% in length and/or width upon exposure to boiling water for five seconds. The polymer film may be a single layer of a polymer having no other layer comprising any polymer (same or different), or no layer of metal, on a surface opposite the one bearing the primer and the heat seal composition.

Polyolefins suitable for forming the self-supporting layer of polymer film used in the present invention may include any of the polyolefins described herein which are capable of being formed into a film (filmable) alone (i.e. as a substantially pure polymer) and/or in a mixture and/or copolymer with other polymers (such as any described herein). Preferred polyolefin films are polypropylene (PP) and/or polyethylene (PE), biaxially orientated polypropylene (BOPP) film being more preferred.

Polyesters suitable for forming the self-supporting layer of polymer film used in the present invention may include any of the following which are capable of being formed into a film alone and/or in a mixture and/or copolymer with other polymers (such as any other polymers, e.g. polyesters, described herein).

Aliphatic polyester homopolymers such as polyglycolide or polyglycolic acid (PGA), polylactic acid (PLA), polycaprolactone (PCL), polyhydroxyalkanoate (PHA) and/or polyhydroxybutyrate (PHB).

Aliphatic polyester copolymers such as polyethyien adipate (PEA), polybutylene succinate (PBS) and/or poly(3-hydroxybutyrate-co-3-hydroxyvalerate) (PHBV).

Semi-aromatic polyester copolymers such as polyethylene terephthalate (PET), polybutylene terephthalate (PBT), polytrimethylene terephthalate (PTT), polyethylene naphthalate (PEN) and/of polyethylene furanoate (PEF).

Aromatic polyester copolymers such as the polymer obtained and/or obtainable by poiycondensation of 4-hydroxybenzoic acid and 6-hydroxynaphthalene-2-carboxylic acid and available commercially from Kuraray under the tradename Vectran™.

Also suitable for use in the present invention are filmable polar polymers such as polyaryletherketones (PAEK), e.g. polyether ether ketone (PEEK) available commercially from Victrex Plc under the registered trademark Victrex®.

Polyesters and/or polyaryletherketones suitable for use as the polar polymer film in the present invention may comprise at least one polymer selected from the group consist rig of; aliphatic polyester homopolymers (such as PGA, PLA, PCL, PHA and/or PHB); aliphatic polyester copolymers (such as PEA, PBS and/or PHBV); semi-aromatic polyester copolymers (such PET, PBT, PU, PEN and/or PEF); aromatic polyester copolymers (such as Vectran™), PEEK polymers (such as those available commercially under the registered trademark Victrex®), any suitable mixtures, combinations and copolymers thereof.

Preferred polymers suitable for use as the polar polymer film in the present invention comprise at least one polymer selected from the group consisting of: PGA, PLA, PCL, PHA, PHB, PEA, PBS, PHBV, PET, PBT, PTT, PEN, PEF, Vectran®, PEEK and/or any suitable mixtures, combinations and copolymers thereof.

More preferred polyesters suitable for use as a polymer film in the present invention comprise at least one polyester selected from the group consisting of: PLA, PHB, PET, PEN, PEF, any suitable mixtures, combinations and copolymers thereof.

Even more preferred polyesters suitable for use as the polymer film in the present invention comprise at least one polymer selected from the group consisting of: PET, PEN and PEF.

Most preferred polyesters suitable for use as the polymer film in the present invention comprise at least one polymer selected from the group consisting of: PET and PEN.

For example polyesters suitable for use as the polymer film in the present invention comprise at least one PET polymer.

Primer Layer

The optional primer layer where present m y comprise a halo polyvinyiidine polymer, (such as a PVdX polymer where X is halo), preferably a polyvinylidene chloride polymer (e.g. were X is chloro, i.e. PVdC) and/or an acrylic polymer and/or a vinyl polymer (preferably an EVA polymer). Useful acrylic and/or vinyl polymer(s) for inclusion in the primer layer are those described herein for inclusion in the heat seal layer such that the heat seal layer sufficiently adheres to the primer layer to resist delamination. Ethylene-acrylic acid (EAA) and/or ethylene-methacrylic acid (EMA) primers may also be used. Alternatively the primer layer may be absent if the self-supporting layer of the polymer film is a corona treated polyolefin film, the surface of which has thus been activated sufficiently such that the heat sealable composition may be applied directly to the unprimed polyolefin film and adhere strongly thereto.

A primer composition may be applied to the self-supporting layer of the polymer film used to prepare the composite fifths of the invention, the primer composition comprising suitable amounts of halo polyvinylidene, acrylic resin(s) and/or vinyl resin(s) therein. Thus the optional primer layer may also comprise any halo polyvinylidene polymer, acrylic resin and/or vinyl resin in any suitable mixtures thereof in any suitable ratios or amounts.

The total amounts of acrylic and/or vinyl resin that may be, present in the primer layer may be in the same amounts given herein for the acrylic and/or vinyl resin present in the heat seal layer, the remainder of the primer layer being the PVdX component. Preferably the primer layer comprises, more preferably consists of halo polyvinylidene polymer (e.g. PVdC polymer), acrylic resin and/or vinyl resin (e.g. EVA), even more preferably is PVdC and/or EVA, most preferably is PVdC.

Where the primer composition comprises acrylic resin(s) and/or vinyl resin(s) although the amounts (expressed as a weight percentage based on the total weight of the primer composition or layer being 100%) of these components may correspond to the total weight of acrylic resin(s) and/or vinyl resin(s) by weight given herein for the amounts present in the heat sealing composition or layer, it will be appreciated that the amounts of acrylic resin(s) and/or vinyl resin(s) that may be present in each of the primer layer and/or heat seal layer is calculated separately and independently.

Coating (Heat Sealing and/or Primer) Composition and Method

The above components may be applied to a polymer film such as a polyester substrate from a solution in an organic solvent or mixture thereof. Any conventional coating method, such as spray coating, roll coating, slot coating, meniscus coating, immersion coating, wire-bar coating, air knife coating, curtain coating, doctor knife coating, direct and reverse gravure coating, and the like, may be used to apply the coating composition. The coating is then dried.

A yet other aspect of the invention provides a packaging article which is a cap for a packaging article lined with a composite film of the invention as described herein.

A still yet other aspect of the invention provides a filled packaging article sealed with a cap of the invention as described herein A still yet another aspect of the invention provides a method of filling a packing article with a food stuff or human and/or animal consumable liquid comprising the steps of:

a) filling the article with the foodstuff or human or animal consumable liquid;

b) applysng to the filled article the cap of the invention to reversibly seal the article.

Unless the context dearly indicates otherwise, as used herein plural forms of the terms herein are to be construed as including the singular form and vice versa.

The term "comprising" as used herein will be understood to mean that the list following is non exhaustive and may or may not include any other additional suitable items, for example one or more further feature(s), component(s), ingredient(s) and/or substituent(s) as appropriate.

The terms "consisting", "consisting of" and/or "is" as used her will be understood to mean that the following list is substantially exhaustive so generally comprises the listed component(s) as the major component(s) thereof, and may for example thus exclude other additional items.

"Major component" (or synonyms thereof) as used herein will be understand to mean an proportion where any additional elements or additives present have no substantial effect on the properties of the component and thus the major component may be present in an amount of at least 50%, preferably at least 60%, more preferably at least 70%, most preferably at least 80%, especially at least 90%, most especially about 99% parts of the relevant whole.

The terms "effective", "acceptable" "active" and/or "suitable" (for example with reference to any process, use, method, application, preparation, product, material, formulation, compound, monomer, oligomer, polymer precursor, and/or polymers of the present invention and/or described herein as appropriate) will be understood to refer to those features of and/or used on the invention which if used in the correct manner provide the required properties to that which they are added and/or incorporated to be of utility as described herein. Such utility may be direct for example where a material has the required properties for the aforementioned uses and/or indirect for example where a material has use as a synthetic intermediate and/or diagnostic tool in preparing other materials of direct utility. As used herein these terms also denote that a functional group is compatible with producing effective, acceptable, active and/or suitable end products.

Preferred utility of the present invention comprises one or more of uses of a film as a heat sealable component (such as a lid) of a packaging article such as an ovenable tray for food and/or as a liner for a cap for a packaging article.

In the discussion of the invention herein, unless stated to the contrary, the disclosure of alternative values for the upper and lower limit of the permitted range of a parameter coupled with an indicated that one of said values is more preferred than the other, is to be construed as an implied statement that each intermediate value of said parameter, lying between the more preferred and less preferred of said alternatives is itself preferred to said less preferred value and also to each less preferred value and said intermediate value.

For all upper and/or lower boundaries of any parameters given herein, the boundary value is included in the value for each parameter. It will also be understood that all combinations of preferred and/or intermediate minimum and maximum boundary values of the parameters described herein in various embodiments of the invention may also be used to define alternative ranges for each parameter for various other embodiments and/or preferences of the invention whether or not the combination of such values has been specifically disclosed herein.

Thus for example a substance stated as present herein in an amount from 0 to "x" (e.g. in units of mass and/or weight %) is meant (unless the context clearly indicates otherwise) to encompass both of two alternatives, firstly a broader alternative that the substance may optionally not be present (when the amount is zero) or present only in an de-minimus amount below that can be detected. A second preferred alternative (denoted by a lower amount of zero in a range for amount of substance) indicates that the substance is present, and zero indicates that the lower amount is a very small trace amount for example any amount sufficient to be detected by suitable conventional analytical techniques and more preferably zero denotes that the lower limit of amount of substance is greater than or equal to 0.001 by weight % (calculated as described herein).

It will be understood that the total sum of any quantities expressed herein as percentages cannot (allowing for rounding errors) exceed 100%. For example the sum of all components of which the composition of the invention (or part(s) thereof) comprises may, when expressed as a weight (or other) percentage of the composition (or the same part(s) thereof), total 100% allowing for rounding errors. However where a list of components is non exhaustive the sum of the percentage for each of such components may be less than 100% to allow a certain percentage for additional amount(s) of any additional component(s) that may not be explicitly described herein.

The term "substantially" as used herein may refer to a quantity or entity to imply a large amount or proportion thereof, Where it is relevant in, the context in which it is used "substantially" can be understood to mean quantitatively (in relation to whatever quantity or entity to which it refers in the context of the description) there comprises an proportion of at least 80%, preferably at least 85%, more preferably at least 90%, most preferably at least 95%, especially at least 98%, for example about 100% of the relevant whole. By analogy the term "substantially-free" may similarly denote that quantity or entity to which it refers comprises no more than 20%, preferably no more than 15%, more preferably no more than 10%, most preferably no more than 5%, especially no more than 2%, for example about 0% of the relevant whole.

The terms "optional substituent" and/or "optionally substituted" as used herein (unless followed by a list of other substituents) signifies the one or more of following groups (or substitution by these groups): carboxy, suipho, formyl, hydroxy, halo amino, imino, nitrilo, mercapto, cyano, nitro, methyl, methoxy and/or combinations thereof. These optional groups include all chemically possible combinations in the same moiety of a plurality (preferably two) of the aforementioned groups (e.g. amino and suiphonyl if directly attached to each other represent a sulphamoyl group). Preferred optional substituents comprise: carboxy, sulpha, hydroxy, amino, mercapto, cyano, methyl, chloro, fluro trihalomethyl and/or methoxy.

The synonymous terms "organic substituent" and "organic group" as used herein (also abbreviated herein to "organo") denote any univalent or multivalent moiety (optionally attached) to one or more other moieties) which comprises one or more carbon atoms and optionaily one or more other heteroatoms. Organic groups may comprise organoheteryl groups (also known as organoelement groups) which comprise univalent groups containing carbon, which are thus organic, but which have their free valence at an atom other than carbon (for example organothio groups). Organic groups may alternatively or additionally comprise organyl groups which comprise any organic substituent group, regardless of functional type, having one free valence at a carbon atom. Organic groups may also comprise heterocyclyl groups which comprise univalent groups formed by removing a hydrogen atom from any ring atom of a heterocyclic compound: (a cyclic compound having as ring members atoms of at least two different elements, in this case one being carbon). Preferably the non carbon atoms in an organic group may be selected from: hydrogen, halo, phosphorus, nitrogen, oxygen, silicon and/or sulphur, more preferably from hydrogen, nitrogen, oxygen, phosphorus and/or sulphur.

Most preferred organic groups comprise one or more of the following carbon containing moieties: alkyl, alkoxy, aikanoyl, carboxy, carbonyl, formyl and/or combinations thereof; optionally in combination with one or more of the following heteroatom containing moieties: oxy, thio, sulphinyl, sulphonyl, amino, imino, nitrilo and/or combinations thereof. Organic groups include all chemically possible combinations in the same moiety of a plurality (preferably two) of the aforementioned carbon containing and/or heteroatom moieties (e.g. alkoxy and carbonyl if directly attached to each other represent an alkoxycarbonyl group).

The term "hydrocarbo group" as used herein is a sub set of an organic group and denotes any univalent or multivalent moiety (optionally attached to one or more other moieties) which consists of one or more hydrogen atoms and one or more carbon atoms and may comprise one or more saturated, unsaturated and/or aromatic moieties. Hydrocarbo groups may comprise one or more of the following groups. Hydrocarbyl groups comprise univalent groups formed by removing a hydrogen atom from a hydrocarbon (for example alkyl). Hydrocarbylene groups comprise divalent groups formed by removing two hydrogen atoms from a hydrocarbon, the free valencies of which are not engaged in a double bond (for example alkylene). Hydrocarbylidene aroups comprise divalent groups (which may be represented by "R2C=") formed by removing two hydrogen atoms from the same carbon atom of a hydrocarbon, the free valencies of which are engaged in a double bond (for example alkylidene). Hydrocarbylidyne groups comprise trivalent groups (which may be represented by "RC≡"), formed by removing three hydrogen atoms from the same carbon atom of a hydrocarbon the free valencies of which are engaged in a triple bond (for example alkylidyne). Hydrocarbo groups may also comprise saturated carbon to carbon single bonds (e.g. in alkyl groups); unsaturated double and/or triple carbon to carbon bonds (e.g. in respectively alkenyl and alkynyl groups); aromatic groups (e.g, in aryl groups) and/or combinations thereof within the same moiety and where indicated may be substituted with other functional groups The term "alkyl" or its equivalent (e.g. "alk") as used herein may be readily replaced, where appropriate and uniess the context clearly indicates otherwise, by terms encompassing any other hydrocarbo group such as those described herein (e.g. comprising double bonds, triple bonds, aromatic moieties (such as respectively alkenyl, aikynyl and/or aryl) and/or combinations thereof (e.g. aralkyl) as well as any multivalent hydrocarbo species linking two or more moieties (such as bivalent hydrocarbylene radicals e.g. alkylene).

Any radical, substituent, group or moiety mentioned herein may be a multivalent or a monovalent species but is preferably monovalent species unless otherwise stated or the context clearly indicates otherwise (e.g. a bivalent hydrocarbylene moiety linking two other moieties (such as an alkylene moiety). However where indicated herein such monovalent or multivalent species may still also comprise optional substituents. A group which comprises a chain of three or more atoms signifies a group in which the chain wholly or in part may be linear, branched and/or form a ring (including spire and/or fused rings). The total number of certain atoms is specified for certain substituents for example $C_{1-N}$organo, signifies an organo moiety comprising from 1 to N carbon atoms. In any of the formulae herein if one or more substituents are not indicated as attached to any particular atom in a moiety (e.g. on a particular position along a chain and/or ring) the substituent may replace any H and/or may be located at any available position on the moiety which is chemically suitable and/or effective.

Preferably any of the organo groups listed herein comprise from 1 to 36 carbon atoms, more preferably from 1 to 18. It is even more preferred that the number of carbon atoms in an organo group is from 1 to 12, most preferred from 1 to 10, even most preferred from 1 to 6, for example from 1 to 4 carbon atoms.

As used herein chemical terms (other than IUAPC names for specifically identified compounds) which comprise features which are given in parentheses—such as (alkyl)acrylate, (meth)acrylate and/or (co)polymer—denote that that part in parentheses is optional as the context dictates, so for example the term (meth)acrylate denotes both methacrylate and acryiate, The substituents on the repeating unit of a polymer and/or oligomer may be selected to improve the compatibility of the materials with the polymers and/or resins in which they may be formulated and/or incorporated for the uses described herein. Thus the size and length of the substituents may be selected to optimise the physical entanglement or interlocation with the resin or they may or may not comprise other reactive entities capable of chemically reacting and/or cross-linking with such other resins as appropriate.

Certain moieties, species, groups, repeat units, compounds, oligomers, polymers, materials, mixtures, compositions and/or formulations which comprise and/or are used In some or all of the invention as described herein may exist as one or more different forms (such as isomeric and/or physical forms) which comprise any of those in the following non exhaustive list:

stereoisomers (such as enantiomers (e.g. E and/or Z forms), diastereoisomers and/or geometric isomers); tautomers (e.g. keto and/or enol forms), conformers, salts, zwitterions, complexes (such as chelates, clathrates, crown compounds, cyptands cryptades, inclusion compounds, intercalation compounds, interstitial compounds, ligand complexes, organometallic complexes, non-stoichiometric complexes, n-adducts, solvates and/or hydrates); isotopically substituted forms, polymeric configurations [such as homo or copolymers, random, graft and/or block polymers, linear and/or branched polymers (e.g. star and/or side branched), hyperbranched polymers (such as those of the type described in WO 93/17060), cross-linked and/or networked polymers, polymers obtainable from di and/or trivalent repeat units, dendritic macromolecules (such as dendrimers), polymers of different tacticity (e.g. isotactic, syndiotactic or atactic polymers)]; polymorphs (such as interstitial forms, crystalline forms and/or amorphous forms), different phases, solid solutions; and/or combinations thereof and/or mixtures thereof where possible. The present invention comprises and/or uses all such forms which are effective (e.g. as defined herein).

Other conventional terms from polymer science that are used herein (such as polymer, monomer, oligomer etc) shall have those meanings recommended by IUPAC and as defined in Pure Appl. Chem., Vol. 68, No. 12, pp. 2287-2311, 1996, the contents of which are incorporated herein by reference. The terms "resin" and "polymer" are, unless the context clearly indicates otherwise, used herein interchangeably so for example the terms acrylic resin and vinyl resin also denote acrylic polymer and vinyl polymer respectively and vice versa.

The formuia(e) herein may represent a polymeric mixture or a series of discrete compounds. If the formula(e) herein represent species which are monodisperse (such as compounds) then the values of any numerical variables denoted therein (such as 'n' and the like, for example denoting the number of repeat units) are independently an integer (or zero if the context allows) within the specified range. If the formula represents the average structure of many discrete species present in a poiydisperse oligomeric and/or polymeric mixture then the numerical values of any variables shown in the formula may be real, non-integer, numbers with the specified ranges.

It is appreciated that certain features of the invention, which are for clarity described in the context of separate embodiments may also be provided in combination in a single embodiment. Conversely various features of the invention, which are for brevity, dscribed in the context of a single embodiment, may also be provided separately or in any suitable sub-combination. Many other variations embodiments of the invention will be apparent to those skilled in the art and such variations are contemplated within the broad scope of the present invention.

Further aspects of the invention and preferred features thereof are given in the claims herein.

EXAMPLES

The present invention will now be described in detail with reference to the following non limiting examples provided to further illustrate the processes and compositions of the present invention. These examples are illustrative only and are not intended to limit the scope of the invention in any way. Unless otherwise specified all parts, percentages, and ratios are on a weight basis. The prefix C or COMP before an example indicates that it is comparative and does not form part of the invention.

Various registered trademarks, other designations and/or abbreviations are used herein to denote some oof ingredients used to prepare polymers and compositions of the invention. These are identified below by chemical name and/or trade name and optionally their manufacturer or supplier from whom they are available commercially. However where a chemical name and/or supplier of a material described herein is not given it may easily be found for example in reference literature well known to those skilled in the art.

Unless otherwise indicated, all compositional percentages and ratios recited herein are on a weight basis and all coating weights refer to dried coating weights. The following ingredients are referred to in the Examples discussed further below. Affinity™ GA 1950 polymer is an ethyiene-octene polyolefin elastomer avaiiable from Dow, produced by metallocene-catalyzed polymerization.

Elvax® 3180 resin is an EVA containing 28% vinyl acetate and 72% ethylene units, available from DuPont.

Elvax® 3185 resin is an EVA containing 32% vinyl acetate and 68% ethylene units, available from DuPont.

Elvax® 4260 resin is an EVA containing 28% vinyl acetate, 71% ethylene and about methacrylic add units, available from DuPont.

Engage™ 8200 polyolefin elastomer is an ethylene-octene copolymer available from Dow, produced by metallocene-catalyzed solution polymerization.

Exacta™ plastomers are ethylene-alpha olefin copolymers available from ExxonMobil, produced by metallocene-catalyzed polymerization.

Kemamide® EZ is a fatty amide (erucamide) slip agent, available from Chemtura.

Pentalyn® H tackifier resin has a ring & ball softening point of 94-102° C. and is available from Pinova Solutions.

Picroiyte® A115, C115, and F115 tackifier resins have a ring & ball softening point of 112-118° C. and are available from Pinova Solutions.

Queo™ 7007LA polymer is an ethylene-based octene-1 plastomer with a melting point of 62° C., produced by metaliocene-catalyzed solution polymerization, available from Borealis.

Queo™ 8201 polymer is an ethylene-based octene-1 plastomer produced by metalocene-catalyzed solution polymerization, available from Borealis.

Syloid® 620 matting agent is an amorphous synthetic silica, available fr Grace.

Vistamaxx™ 5102 polymer is primarily composed of isotactic propylene repeat units with random ethylene distribution available from ExxonMobil, produced by metallocene-catalyzed polymerization.

Vistamaxx™ 6202 polymer is an ethylene-propylene elastomer available'frorr ExxonMobil, produced by metallocene-catalyzed polymerization.

Heat seal strength (also referred to herein as peel strength) of coatings to high density polyethylene (HDPE) or polypropylene (PP) was assessed as follows. The coated polymer film, i.e. the composite film, was sealed to HDPE or PP using a Sentinel heat sealer (Model 12 by Packaging Industries Group Inc.). Unless otherwise stated, the heat sealer parameters were: 350° F. (~177° C.) (top jaw), 100° F. (~38° C.) (bottom jaw)/1 second/80 psi (~552 kPa). In cases where the top jaw was at some other temperature, the bottom jaw was still at approximately 100° F. (~38° C.), with some slight variation. The sealed sample was marked and cut into 25 mm width strips, and the heat seal strength was determined by peel strength testing on an INSTRON® model 4464 test machine. The jaws were set 50 mm apart. The upper jaw held film piece of the sealed sample and travelled up at a speed of 250 mm/min, while the lower jaw held HDPE or PP piece of the sealed sample and was stationary. The average force needed to separate the two pieces of film was recorded. Five sealed sample pieces were measured for each coated sample.

In the examples herein when an example is described as repeated and/or prepared the same as another example described herein it is prepared analogously to the previous example using the same ingredients used in the same amounts in the same manner except where otherwise indicated.

Example C1 and Examples 2, 3 & 4

Example C1

Comparative, Heat Seal Composition Comprising No POP Resin

This heat seal composition contained no POP resin. A heat seal coating solution was prepared by dissolving Elvax® 3180 (9.0 g, DuPont, 28% vinyl acetate by weight, ~60 wt % EVA resin by weight of the heat seal composition), Piccolyte® C115 tackifier resin (5.4 g, Pinova, 36 wt % tackifier resin by weight of the heat seal composition), Syloid 620 (0.375 g, Grace ~2.5 wt % matting agent by weight of heat seal composition) and Kemamide® EZ (0.225 g, Chemtura ~1.5 wt % slip agent by weight of heat seal composition) in 100 ml of toluene at 65° C. This heat seal coating solution was coated on a 23 μm (micron) PET polymer film primed with Elvax® 4260 EVA resin using a Mayer coating rod (coating weight, 5.5 g/m$^2$). The coated film, i.e. the composite film was dried for 2 min in a forced air oven preset to 115° C. The composite film was sealed onto HDPE and PP substrates [300° F. (~149° C.)/1 sec.] and the seal strengths were 892 g force/inch (~344 N/m) (HDPE) and 615 g force/inch (~237 N/m) (PP).

Example 2

6 wt % POP

Comparative Example C1 was repeated, except that 0.9 g of Elvax® 3180 resin was replaced by Queo™ 7007LA polymer to prepare a composite film of the invention. The other amounts of the ingredients were unchanged so the heat seal composition of Example 2 comprised 8.1 g (~54 wt %) EVA resin and 0.9 g POP resin (~6 wt %). The seal strengths of the resultant composite film tested as described in Example C1, were 1105 g force/inch (~427 N/m) (HDPE) and 756 g force/inch (~292 N/m) (PP).

Example 3

30 wt % POP

Comparative Example 1 was repeated, except that 4.5 g of Elvax® 3180 resin was replaced by Queo™ 7007LA polymer to prepare a composite film of the invention. The other amounts of the ingredients were unchanged so the heat seal composition of Example 3 comprised 4.5 g (~30 wt %) EVA resin and 4.5 g POP resin (~30 wt %). The seal strengths of the resultant composite film tested as described in Example C1, were 1447 g force/inch (~559 N/m) (HDPE) and 761 g force/inch (~294 N/m) (PP).

Example 4

60 wt % POP

Comparative Example 1 was repeated, except that the 9.0 g of Elvax® 3180 resin was replaced entirely by the same amount of Queo™ 7007LA polymer to prepare a composite film of the invention. The other amounts of the ingredients were unchanged so the heat seal composition of Example 3 comprised no EVA resin and 9.0 g POP resin (~60 wt %). The seal strengths of the resultant composite film tested as described in Example C1 were 1415 force g/inch (~546 N/m) (HDPE) and 743 g force/inch (~287 N/m) (PP).

Example C5 and Examples 6, 7 & 8

The Heat Seal Coating of Ex 3 (Elvax® 3180/Queo™ 7007LA/Piccolyte®) Effect of Primer on PET Example C5

Comparative—Unprimed PET Polymer Film

The PET polymer film of Example C1 was not primed (nor was it corona treated) and was used to provide a comparative example. Example 3 was repeated, except that coating weight was 6.5 g/m² on unprimed PET polymer film. The seal strengths were 744 g force/inch (~287 N/m) (HDPE) and 775 g force/inch (~299 N/m) (PP). A significant amount of heat seal coating was left on the HDPE and PP after sample testing, indicating poor adhesion between the heat seal coating and PET polymer film on non-corona treated PET film without a primer layer.

Example 6

PVdC Primed PET Polymer Film

Example C5 was repeated, except that the PET polymer film was primed with PVdC. The seal strengths were 1454 g force/inch (~561 N/m) (HDPE) and 815 g force/inch (~315 N/m) (PP).

Example 7

EVA Primed PET Polymer Film

Example 5 was repeated, except that PET polymer film primed with Elvax® 4260 EVA resin was used. The seal strengths were 1564 g force/inch (~604 N/m) (HDPE) and 791 g force/inch (~305 N/m) (PP).

Example 8

EAA Primed PET Polymer Film

Example 5 was repeated, except that an EAA-primed PET polymer film was used. The seal strengths were 712 g force/inch (~275 N/m) (HDPE) and 894 g force/inch (~345 N/m) (PP). The clean peel of the composite film from HDPE shows that the heat sealable top coat is particularly effective at adhering to the EAA primed PET polymer film and thus the composite film resists delamination when peeled from a HDPE surface. Other POP and EVA resins (Examples 9 to 16)

Example 9

A heat seal coating solution was prepared by dissolving Elvax® 3185 (2.7 g, DuPont, 32% vinyl acetate by weight ~18 wt % EVA resin by weight of the heat seal composition),), Elvax® 4260 (2.7 g, DuPont, 28% vinyl acetate by weight ~18 wt % EVA resin by weight of the heat seal composition), Affinity™ GA1950 (3.6 g, DOW Chemical Company ~24 wt % POP resin by weight of the heat seal composition), Piccolyte® C115 (5.4 g, Pinova, ~36 wt % tackifier resin by weight of the heat seal composition),), Syloid 620 (0.375 g, Grace, ~2.5 wt % matting agent by weight of heat seal composition) and Kernamide® EZ (0.225 g, Chemtura ~1.5 wt % slip agent by weight of heat seal composition) in 100 mL of toluene at 65° C. This heat seal coating solution was coated on a 23 μm (micron) PET polymer film primed with Elvax® 4260 EVA resin using a Mayer coating rod (coating weight, 6.5 g/m²). The coated film was dried for 2 minutes in a forced air oven preset to 115° C. The coated film, i.e. the composite film, was sealed on HDPE and PP substrates [300° F. (~149° C.)/1 sec.] and the seal strengths were 1200 g force/inch (~463 N/m) (HDPE) and 895 g force inch (~346 N/m) (PP).

Example 10

Example 9 was repeated, except that PVdC-primed PET polymer film was used. The seal strengths were 1300 g force/inch (~502 N/m) (HDPE) and 847 g force/inch (~327 N/m) (PP).

Example 11

Example 10 was repeated, except that the Affinity™ GA1950 POP resin as replaced by the same weight of Vistamaxx™ 6202 (ExxonMobil) (3.6 g ~24 wt % POP resin by weight of the heat seal composition). The seal strength was 1190 g force/inch (~459 N/m) (PP).

Example 12

Example 10 was repeated, except that the Affinity™ GA1950 POP resin vas replaced by the same weight of Vistamaxx™ 6102 (ExxonMobil)) (3.6 g ~24 wt % POP resin by weight of the heat seal composition). The 5.4 g Piccolyte® C115 tackifier resin was replaced by the same weight of Pentalyn® H tackifier resin (Pinova) (5.4 g ~36 wt % tackifier resin by weight of the heat seal composition). The seal strength was 1080 g force/inch (~417 N/m) (PP).

Example 13

Example 9 was repeated, except that the Affinity™ GA1950 POP resin was replaced by the same weight of Queo™ 8201 POP polymer) (3.6 g 24 wt % POP resin by weight of the heat seal composition). The seal strengths were 1115 g force/inch (~430 N/m) (HDPE) and 714 g force/inch (~276 N/m) (PP).

Example 14

Example 10 was repeated, except that the Affinity™ GA1950 POP resin was replaced by the same weight of Queo™ 7007LA POP polymer (3.6 g ~24 wt % POP resin by weight of the heat seal composition). The seal strengths were 1230 g force/inch (~475 N m) (HDPE) and 849 g force/inch (~337 N m) (PP).

Example 15

Example 14 was repeated, except that Elvax® 3185 and Elvax® 4260 EVA resins were replaced together by the same total amount of Elvax® 420, low-VA EVA resin (5.4 g ~36 wt % EVA resin by weight of the heat seal composition). The seal strengths were 1277 g force/inch (~493 N/m) (HDPE) and 923 g force/inch (~356 N/m) (PP). The Elvax® 420 had very good compatibility with the Queo™ 7007LA POP polymer, as indicated by better, film clarity.

Example 16

Example 9 was repeated, except that the Affinity™ GA1950 POP resin was replaced by the same weight of Engage™ 8200 POP resin (DOW Chemical Company) (3.6 g ~24 wt % POP resin by weight of the heat seal composition) and coating weight was 8.5 g/m². The seal strengths were 1480 g force/inch (~571 N/m) (HDPE) and 1039 g force/inch (~422 N/m) (PP).

FIG. 1 shows peel strength as a function of the temperature at which heat sealing was performed for a composite film, comprising a PET polymer film primed with Elvax® 425C EVA resin and coated at 6.8 g/m² with a heat seal composition as described in Example 15, heat sealed to an HDPE substrate. Also shown are the corresponding results for a commercially available PET film extrusion-coated at about 12.5 g/m² with a conventional EVA heat seal composition, heat sealed to an HDPE substrate under the same conditions.

Figure 2:
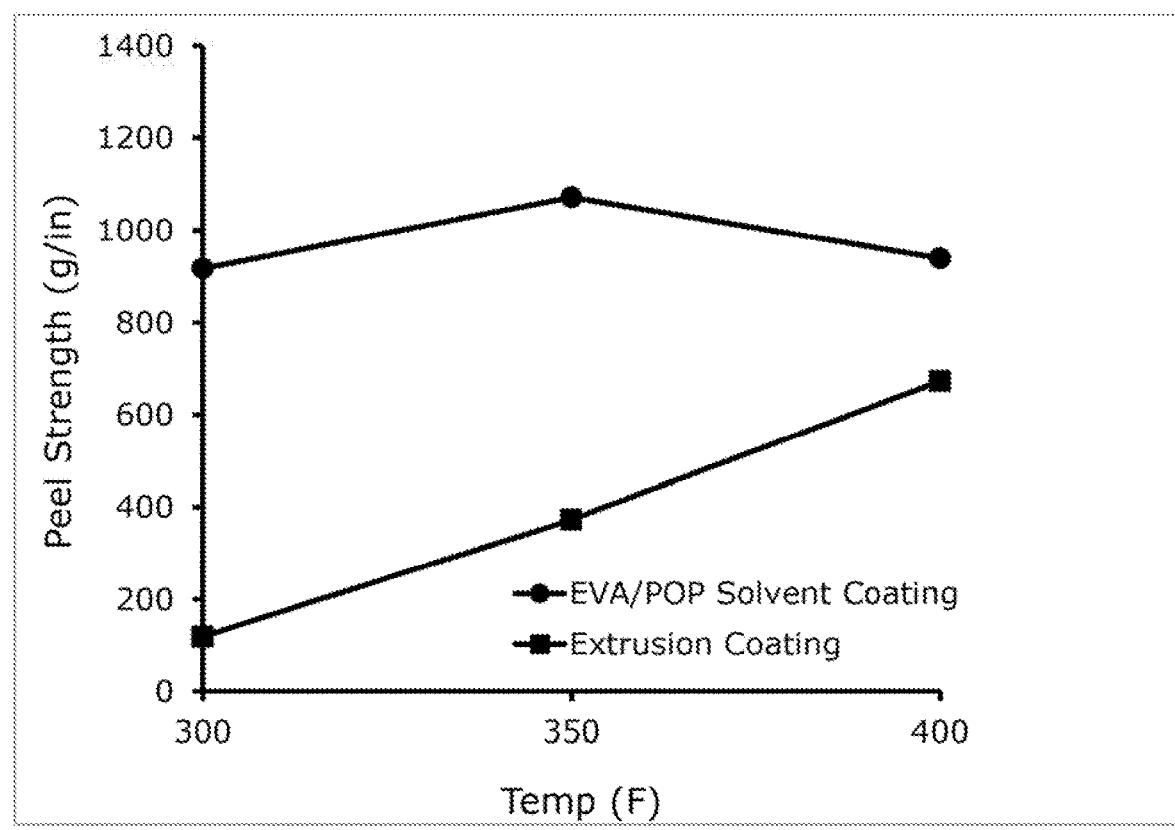
FIG. 2 shows peel strength results for runs analogous to those depicted in FIG. 1, with a polypropylene substrate instead of an HDPE substrate.

FIG. 2 shows peel strength results for runs analogous to those depicted in FIG. 1, with a polypropylene substrate instead of an HDPE substrate.

As seen in FIGS. 1 and 2, peel strengths were significantly higher using a heat seal composition according to the invention, and the peel strengths were more nearly constant with respect to heat sealing temperature.

Effect of Heat Seal Coating Composition on Seal Strength to HDPE

Example 17 and C18, C19 & C20

Example 17

A heat seal coating solution was prepared by dissolving EVA (6.12 g, Elvax® 4260 resin, DuPont ~25 wt % EVA resin by weight of the heat seal composition), POP (4.50 g, Queo™ 7007LA polymer, 24 wt % POP resin by weight of the heat seal composition), tackifier (6.6 6 g, Piccolyte® C115, ~37 wt % tackifier resin by weight of the heat seal composition), in 100 mL of toluene at 65° C., followed by adding Kemamide-EZ (0.17 g ~0.9 wt % slip agent by weight of the heat seal composition), Kemamide W20 (0.15 g ~0.8 wt % slip agent by weight of the heat seal composition)) and Syloid 620 (0.40 g ~2.2 wt % matting agent by weight of the heat seal composition). This heat seal coating solution was coated on a 23 μm (micron) PVdC primed PET polymer film using a Mayer coating rod (coating weight, 6.5 g/m²). The coated film was dried at 115° C. in an oven for 2 minutes. The coated film, i.e. the composite film, was sealed onto a HDPE substrate [80 psi (~552 kPa)/1 sec.] at different temperatures, and seal strength was measured on an INSTRON® model 4464 test machine.

Examples C18, C19 & C20 (Comparative)

Comparative Examples C18 to C20 were performed as in Example 17 using the heat seal compositions shown in Table 1, which reports the peel strengths in g force/inch (with the peel strength values in parentheses converted to N/m). These examples were prepared as follows.

Example C16

Comparative, Too Little Tackifier

Example 17 was repeated, except that the weight of the same Piccolyte® C115 tackifier resin was reduced to 1.8 g (~10 wt % tackifier resin by weight of the heat seal composition) and the weight of the same Elvax® 4260 EVA resin was increased to 10.98 g (~61 wt % EVA resin by weight of the heat seal composition), and the other ingredients (POP resin, slip agents and matting agent) remained the same and were present at the same weight. Comparative Example C18 had a much lower amount of tackifier compared to the amount of tackifier used in heat seal layer that comprise the composite films of the present invention.

Example C19

Comparative, No Tackifier

Example 17 was repeated, except that the Piccolyte® C115 tackifier resin was omitted and the weight of the same Elvax® 4260 EVA resin was increased to 12.78 g (~71 wt % EVA resin by weight of the heat seal composition), and the other ingredients (POP resin, slip agents and matting agent) remained the same and were present at the same weight, Comparative Example C19 had no tackifier unlike the heat seal layer that comprise the composite films of the present invention.

Example C20

Comparative, No POP Resin

Example 17 was repeated, except that the Queo™ 7007LA POP resin was omitted and the weight of the same Elvax® 4260 EVA resin was increased to 10.62 g (~59 wt % EVA resin by weight of the heat seal composition), and the other ingredients (tackifier resin, slip agents and matting agent) remained the same and were present at the same weight. Comparative Example C20 had no POP resin unlike the heat seal layer that comprise the composite films of the present invention.

The difference between properties of these comparative films C18, C19 and C20 and Example 17 can been seen in Table 1.

strength of the heat seal coating to HDPE, sealed at 350° F. (~177° C.)/80 psi (~552 kPa)/1 sec., was 1240 g force/inch (~479 N/m).

TABLE 1

| Composition (wt %) Sealing Temp/ | EVA/POP/tackifier 34/25/37 | EVA/POP/tackifier 61/25/10 | EVA/POP/tackier 71/25/0 | EVA/POP/tackifier 59/0/37 |
|---|---|---|---|---|
| | | peel strength-g force/inch (N/m) | | |
| ° F. (° C.) | Example 17 | Example C18 | Example C19 | Example C20 |
| 250 (~121) | 214 (~82.6) | <20 (<~7.72) | <20 (<~7.72) | 133 (~51.3) |
| 265 (~129) | 688 (~266) | 41 (~15.8) | 121 (~46.7) | 389 (~150) |
| 275 (135) | 1328 (~513) | 720 (~278) | 682 (~263) | 1159 (~447) |
| 300 (~149) | 1500 (~579) | 1092 (~422) | 1104 (~426) | 1093 (~422) |
| 350 (~177) | 1487 (~574) | 1200 (~463) | 1208 (~466) | 1120 (~432) |
| 400 (~204) | 1474 (~569) | 1314 (~507) | 1302 (~503) | 1131 (~437) |

As can be seen compared to Examples C18 to 20, the composite film of the invention (Example 17) produced a strong heat seal even at a low sealing temperature and the seal strength was relatively constant over a wide sealing temperature range.

Heat Seal Compositions with Other Tackifiers (Examples 21 to 29)

Example 21

Example 21 was prepared the same as Example 17 except that Piccolyte®C115 tackifier resin was replaced by the same weight of Piccolyte® A115 (Pinova Solutions, ring & ball softening point 112-118° C.) (6.66 g ~37 wt % tackifier resin by weight of the heat seal composition). The peel strength of the heat seal coating to HDPE, sealed at 350° F. (~177° C.)/80 psi (~552 kPa)/1 sec., was 1412 g force/inch (~542 N/m).

Example 22

Example 21 was prepared the same as Example 17 except that Piccolyte® C115 tackifier resin was replaced by the same weight of Piccolyte® F115 (Pinova Solutions, ring & ball softening point 112-118° C.) (6.66 g ~37 wt % tackifier resin by weight of the heat seal composition). The peel strength of the heat seal coating to HDPE, sealed at 350° F. (~177° C.)/80 psi (~552 kPa)/1 sec., was 1530 g force/inch (~591 N/m).

Example 23

Example 21 was prepared the same as Example 17 except that Piccolyte® C115 tackifier resin was replaced by the same weight of Piccolyte® C85 (Pinova Solutions, ring & ball softening point 82 to 88° C.) (6.66 g ~37 wt % tackifier resin by weight of the heat seal composition). The peel strength of the heat seal coating to HDPE, sealed at 350° F. (~177° C.)/80 psi (~552 kPa)/1 sec., was 1389 g force/inch (~536 N/m).

Example 24

Example 21 was prepared the same as Example 17 except that Piccolyte® C115 tackifier resin was replaced by the same weight of Foral® 105 (Pinova Solutions, ring & ball softening point 95 to 103° C.) (6.66 g ~37 wt % tackifier resin by weight of the heat seal composition). The peel Example 25

Example 21 was prepared the same as Example 17 except that the Piccolyte® C115 tackifier resin was replaced by the same weight of Pentalyn® H (6.66 g ~37 wt % tackifier resin by weight of the heat seal composition). The peel strength of the heat seal coating to HDPE, sealed at 350° F. (~177° C.)/80 psi (~552 kPa)/1 sec., was 1286 g force/inch (~497 N/m).

Example 26

Example 26 was prepared the same as Example 17 except that 33% of the weight of Piccolyte® C115 was replaced by Foral® 105 (Pinova Solutions, ring & ball softening point 95 to 103° C.) (4.44 g ~12.3 wt % tackifiar resin by weight of the heat seal composition). The peel strength of the heat seal coating to HDPE, sealed at 350° F. (~177° C.)/80 psi (~552 kPa)/1 sec., was 1353 g force/inch (~522 N/m).

Example 27

Example 26 was prepared the same as Example 17 except that Piccolyte® C115 was replaced by Piccotac™ 6095-E (Eastman, ring & ball softening point 98° C.) (6.66 g ~37 wt % tackifier resin by weight of the heat seal composition). The peel strength of the heat seal coating to HDPE, sealed at 350° F. (~177° C.)/80 psi (~552 kPa)/1 sec., was 1290 g force/inch (~498 N/m).

Example 28

Example 26 was prepared the same as Example 17 except that Piccolyte® C115 was replaced by Regalite™ S1100 (Eastman, ring & ball softening point 100° C.) (6.66 g ~37 wt % tackifier resin by weight of the heat seal composition). The peel strength of the heat seal coating to HDPE, sealed at 350° F. (~177° C.)/80 psi (~552 kPa)/1 sec., was 1238 g force/inch (~478 N/m).

Example 29

Example 26 was prepared the same Example 17 except that Piccolyte® C115 was replaced by Foralyn™ 90-FG (Eastman, ring & ball softening point 100° C.) (6.66 g ~37 wt % tackifier resin by weight of the heat seal composition). The peel strength of the heat seal coating to HDPE, sealed at 350° F. (~177° C.)/80 psi (~552 kPa)/1 sec, was 1311 g force/inch (~506 N/m).

Heat Seal Compositions with Higher Tackifier Content (Example 30 & 31)

Example 30

Example 30 was prepared the same as Example 17 except that the weight ratio of EVA/POP/tackifier was 23/23/50 (respectively 4.14 g, 4.14 g and 9 g weight of these ingredients, the weights of the other ingredients being unchanged). The tackifier content was 50% by weight of the heat seal composition. The peel strength of the heat seal coating to HDPE, sealed at 50° F. (~177° C.)/80 psi (~552 kPa)/1 sec. was 1560 g force/inch (~602 N/m).

Example 31

Example 30 was prepared the same as Example 17 except that the ratio of EVA/POP/tackifier was 18/18/60 (respectively 3.24 g, 124 g and 10.8 g weight of these ingredient, the weights of the other ingredients being unchanged. The tackifier content was 60% by weight of the heat seal composition. The peel strength of the heat seal coating to HDPE, sealed at 350° F. (~177° C.)/80 psi (~552 kPa)/1 sec., was 1343 g force/inch (~519 N/m).

Film Blocking and Processability Evaluation of Examples 30 & 31

Roll samples were coated on a pilot coater with the high tackifier heat seal compositions of Examples 30 and 31 on PVdC-primed PET to evaluate fiim blocking and processability. Heat seal coating solution temperature was 50° C., coated film drying temperature was 120° C.; chill roll temperature was 25° C. Both coated rolls were easily unwound without tearing. As seen in Table 2, the static and dynamic coefficient of friction (COF) values were between 0.30 and ~0.50, within the typical range of COF for commercial film products with good processability.

TABLE 2

| Sample | Static COF | Dynamic COF |
|---|---|---|
| Example 30 (50% | 0.37 | 0.362 |
| Example 31 (60% | 0.43 | 0.335 |

Comparison of Two Coatings for Heat Sealing to HDPE and PP (Examples 32 & 33)

Example 32

The heat seal coating solution of Example 17 was prepared except that the Elvax® 4260 EVA resin was replaced with the same weight of Elvax® 420 EVA resin, (DuPont 18% vinyl acetate by weight—6.12 g ~25 wt % EVA resin by weight of the heat seal composition) the other ingredients being the same and present in the same weight. This solution was coated on a 23 μm PET film primed with Elvax® 4260 EVA resin using a Mayer coating rod (coating weight, 3.5 g/m²). The coated film was dried at 115° C. in an oven for 2 minutes.

Example 33

The Example 32 was repeated, but the coating weight was 10 g/m².

The coated films, i.e. the composite films prepared in Examples 32 and 33 were heat sealed to HDPE and PP substrates at 80 psi (~552 kPa) with a one second dwell time at different temperatures, and the seal strengths in g force/inch were measured on an INSTRON® model 4464 test machine. The results for HDPE are shown in Table 3, and for PP in Table 4 (with the peel strength values in g force/inch and in parentheses converted to N/m).

TABLE 3

| | HDPE | | |
|---|---|---|---|
| Sealing Temp/° F. (° C.) | 300 (~149) | 350 (~177) | 400 (~204) |
| Example 32 (peel strength) | 968 (~374) | 1009 | 1032 |
| Example 33 (peel strength) | 1922 | 1892 | 1909 |

TABLE 4

| | PP | | |
|---|---|---|---|
| Sealing Temp (° F.) | 300 (~149) | 350 (~177) | 400 (~204) |
| Example 32 (peel strength) | 701 (~271) | 784 (~303) | 797 (~306) |
| Example 33 (peel strength) | 1310 | 1625 | 1589 |

As seen in Examples 32 and 33, the composite films comprising a heat seal layer with the Elvax® 420 EVA resin with a vinyl acetate content of 18% showed strong peel strength to both HDPE and PP substrates.

Comparison of Example 17 with Comparative Example C34

A Composite Film Comprising an Extrusion-Coated Heat Seal Layer

Example 17 was compared against a commercially available PET film bearing an extrusion-coated LDPE (low density polyethylene) heat seal layer (Comparative Example C34). The results are shown in Table 5 (with the peel strength values in g force/inch and in parentheses converted to N/m).

TABLE 5

| Sealing | Peel strength (g force/inch (N/m) | |
|---|---|---|
| Temp ° F. (° C.) | Example 17 | Extrusion (Example C34) |
| 275 (135) | 1328 (~513) | 1309 (~505) |
| 300 (~149) | 1500 (~579) | 2484 (~959) (shredding) |
| 350 (~177) | 1487 (~574) | weld seal |
| 400 (~204) | 1474 (~569) | weld seal |

HDPE substrate, seal conditions: 80 psi (~552 kPa)/1 sec.

As seen in Table 5, Example 17 provided a peelable productwith consistent peel strength, while the extrusion product (Example C34) had dramatically increased seal strength that resulted in shredding of the film during the peel test, and/or an unpeelable weld seal.

Although the invention is illustrated and described herein with reference to specific embodiments, the invention is not intended to be limited to, the details shown. Rather, various modifications may be made in the details within the scope and range of equivalents of the claims without departing from the invention.

The invention claimed is:

1. A composite film comprising:
   a) a self-supporting layer of a polymer film,
   b) primer layer on the polymer film, and in between the polymer film and a heat seal layer (c), wherein the primer layer comprises a halo polyvinylidene polymer, an acrylic resin and/or a vinyl resin; and
   wherein the heat seal layer comprising a heat seal composition is disposed on the primer layer,
   wherein the heat seal layer composition comprises a polyolefin plastomer (POP) resin, a tackifier and ethylene vinyl acetate (EVA); and where
      i. the tackifier is present in an amount of at least 37% by weight of the heat seal composition, the total weight of the heat seal composition being 100%; and
      ii. the POP resin is present in an amount of no more than 80% by weight of the heat seal composition, the total weight of heat seal composition being 100%.

2. The composite film according to claim 1, wherein the halo polyvinylidene polymer in the primer layer (b) comprises a PVdX resin where X is halo.

3. The composite film according to claim 1, where the acrylic resin and/or vinyl resin present in the primer layer (b) is selected from a resin in the group consisting of: C1-4 alkyl vinyl acetate resin and C1-4(meth) acrylic acid resin.

4. The composite film according to claim 3, where the acrylic and/or vinyl resin is selected from the group consisting of: ethyl acrylate (EA), ethylene vinyl acetate (EVA), ethyl acrylic acid (EAA) and ethyl methacrylic acid (EMA).

5. The composite film according to claim 1, wherein the POP resin in the heat seal layer (c) is selected from resin(s) obtained and/or obtainable from at least one monomer of Formula 1:

$$CH_2=CHR \qquad \text{Formula 1}$$

where R is H or C1-10 alkyl together with at least one other, different, polymer precursor selected from any of I) to V):

I. at least one different polymer precursor also represented by Formula 1
II. at least one polymer precursor represented by Formula 2

$$C_{4\text{-}20}\alpha(\text{alpha}),\omega(\text{omega})\text{-diolefins}; \qquad \text{Formula 2}$$

III. at least one polymer precursor represented by Formula 3

$$C_{3\text{-}20}\alpha(\text{alpha})\text{-olefins}; \qquad \text{Formula 3}$$

IV. at least one polymer precursor represented by Formula 4

$$C_{\geq 18} \text{ diolefins}; \qquad \text{Formula 4 and}$$

V. at least one polymer precursor represented by Formula 5

$$C_{4\text{-}18} \text{ cyclic olefins} \qquad \text{Formula 5.}$$

6. The composite film according to claim 5, where Formula 1 represents an ethylene monomer.

7. The composite film according to claim 5, where the POP resin(s) comprises copolymer(s) of at least one $C_{2\text{-}4}$ alkylene and at least one polymer precursor of any of Formulae 2 to 5.

8. The composite film according to claim 5, where the POP resin comprises a copolymer of ethylene and/or propylene and at least one $C_{5\text{-}20}$ hydrocarbylene.

9. The composite film according to claim 8, where the POP resin comprises a copolymer of ethylene and at least one $C_{6\text{-}15}$ alkylene.

10. The composite film according to claim 9, where the POP resin comprises a copolymer of ethylene and at least one $C_{6\text{-}12}$ alkylene.

11. The composite film according to claim 10, where the POP resin comprises a copolymer of ethylene and at least one linear monounsaturated $C_{6\text{-}10}$ alkylene.

12. The composite film according to claim 11, where the POP resin is a copolymer of ethylene and 1-octene.

13. The composite film according to claim 5, wherein the POP resin has a DSC melting point of below 100° C.

14. The composite film according to claim 1, wherein the POP resin has a number average molecular weight (Mn) from 5000 to 50000 daltons.

15. The composite film according to claim 5, wherein the amount of α (alpha)-olefin comonomer in the POP resin is from 5 to 85 mol %, the total amount of POP resin being 100 mol %.

16. The composite film according to claim 1, wherein the POP resin is present in an amount of no more than 75% by weight of the heat seal composition, the total weight of the heat seal composition being 100%.

17. The composite film according to claim 1, wherein the polymer film layer is formed from a polar polymer and/or a polyolefin polymer.

18. The composite film according to claim 1, wherein the polymer film comprises a polyester or a polyolefin.

19. The composite film according to claim 18, in which the polymer film comprises a biaxially orientated polyester film.

20. The composite film according to claim 18, wherein the polymer film comprises at least one polymer selected from the group consisting of: polypropylene (PP), polyethylene (PE), polyglycolic acid (PGA), polylactic acid (PLA), polycaprolactone (PCL), polyhydroxyalkanoate (PHA), polyhydroxybutyrate (PHB), polyethylene adipate (PEA), polybutylene succinate (PBS), poly(3-hydroxybutyrate-co-3-hydroxyvalerate) (PHBV), polyethylene terephthalate (PET), polybutylene terephthalate (PST), polytrimethylene terephthalate (PTT), polyethylene naphthalate (PEN), polyethylene furanoate (PEF), liquid crystalline aromatic polyester, polyether ether ketone (PEEK) and/or any suitable mixtures, combinations and copolymers thereof.

21. The composite film according to claim 18, wherein the polymer film comprises at least one polyester selected from the group consisting of: polylactic acid (PLA), polyhydroxybutyrate (PHB), polyethylene terephthalate (PET), polyethylene naphthalate (PEN), polyethylene furanoate (PEF), any suitable mixtures, combinations and copolymers thereof.

22. The composite film according to claim 21, wherein the polyester is selected from the group consisting of: PET, PEN and PEF.

23. The composite film according to claim 22, wherein the polyester is selected from the group consisting of: PET and PEN.

24. The composite film according to claim 23, wherein the polyester is PET.

25. The composite film according to claim 1, in which polymer film layer is biaxially oriented.

26. A method of making the composite film according to claim 1, comprising the steps of:

i) applying a coating composition comprising the heat seal composition in a solvent to the primer layer on the polymer film, and then
ii) evaporating the solvent, wherein the heat seal composition comprises
the polyolefin plastomer (POP) resin present in an amount of no more than 80% by weight of the heat seal composition, the total weight of heat seal composition being 100%,
the tackifier present in an amount of at least 37 wt % of the heat seal composition, the total weight of the heat seal composition being 100%;
and the ethylene vinyl acetate (EVA).

27. A method of making a composite film according to claim 26, where the polymer film comprises polyester.

28. A method of making a composite film according to claim 26, where a acrylic resin and/or vinyl resin is present in the primer layer (b) and where the acrylic resin and/or vinyl resin is selected from the group consisting of ethyl acrylate (EA), ethylene vinyl acetate (EVA), ethyl acrylic acid (EAA) and ethyl methacrylic acid (EMA), preferably EVA.

29. A method of bonding a polymer film to a container or a self-supporting film, comprising heat sealing the composite film according to claim 1 to a surface of the container or the self-supporting film.

30. The method according to claim 29, wherein the surface is a polyolefin surface.

31. The method according to claim 30, wherein the surface is a polypropylene (PP) or high density polyethylene (HDPE) surface.

32. A packaging article comprising the composite film according to claim 1 as a heat sealable component.

33. The packaging article of claim 32, wherein the packaging article is an ovenable food container.

34. A packaging article as claimed in claim 33, wherein the ovenable food container comprises a polypropylene (PP) or high density polyethylene (HDPE) tray.

35. A packaging article comprising a cap with a liner, wherein the liner comprises the composite film according to claim 1 as a heat sealable component.

36. The packaging article of claim 35, wherein the packaging article is filled and sealed with the cap.

37. A method of making the filled packaging article of claim 36 comprising the steps of:
a. filling the packaging article with a foodstuff or human and/or animal consumable liquid;
b. applying to the filled packaging article the cap to reversibly seal the article.

* * * * *